United States Patent [19]

Treybig et al.

[11] Patent Number: 5,057,557

[45] Date of Patent: Oct. 15, 1991

[54] MODIFIED EPOXY RESIN COMPOSITIONS

[75] Inventors: Duane S. Treybig; Pong S. Sheih; John M. McIntyre, all of Lake Jackson, Tex.

[73] Assignee: The Dow Chemical Company, Midland, Mich.

[21] Appl. No.: 522,341

[22] Filed: May 11, 1990

[51] Int. Cl.$^5$ .................... C08G 59/50; C08G 59/56; C09D 5/02; C09D 5/44

[52] U.S. Cl. .................... 523/404; 523/414; 523/420; 525/484; 525/504; 528/93; 528/97; 528/99; 528/102; 528/104; 528/113; 528/117; 528/118; 528/121; 528/122; 528/123; 528/407

[58] Field of Search ............ 528/121, 122, 123, 407, 528/93, 97, 99, 102, 104, 113, 117, 118; 523/404, 414, 420; 525/484, 504

[56] References Cited

U.S. PATENT DOCUMENTS

| | | |
|---|---|---|
| 3,351,610 | 11/1967 | Preninger et al. .................. 528/122 |
| 3,839,252 | 10/1974 | Bosso et al. . |
| 3,945,953 | 3/1976 | Zondler .......................... 528/123 X |
| 3,962,165 | 6/1976 | Bosso et al. . |
| 4,007,154 | 2/1977 | Schimmel et al. . |
| 4,066,592 | 1/1978 | Wismer et al. . |
| 4,069,210 | 1/1978 | Schimmel . |
| 4,076,676 | 2/1978 | Sommerfeld . |
| 4,164,487 | 8/1979 | Martin . |
| 4,191,674 | 3/1980 | Wismer et al. . |
| 4,383,073 | 5/1983 | Wessling et al. . |
| 4,468,307 | 8/1984 | Wismer et al. . |
| 4,515,911 | 5/1985 | Swider et al. . |
| 4,636,541 | 6/1987 | Stevens et al. . |
| 4,698,141 | 10/1947 | Anderson et al. . |
| 4,711,917 | 12/1987 | McCollum et al. . |

*Primary Examiner*—Earl Nielsen

[57] ABSTRACT

Epoxy resins are modified by reaction with an acidified polytertiary amine-containing compound. These modified epoxy resins when cured result in products having improved properties.

22 Claims, No Drawings

MODIFIED EPOXY RESIN COMPOSITIONS

FIELD OF THE INVENTION

The present invention concerns epoxy resin compositions which have been modified with acidified polytertiary aliphatic or cycloaliphatic amine compounds.

BACKGROUND OF THE INVENTION

Epoxy resins are employed in the preparation of casting, molding and coating compositions and the like, the resultant products having desirable properties. However, there is always a need for products having improved properties.

Coatings can be prepared either from water-borne or solvent-borne epoxy resin systems. However, government regulations written to reduce ozone formation encourage paint manufacturers to develop water-borne systems, especially those systems having low volatile organic content (VOC). Tropospheric ozone is formed when solvents vaporized from coating compositions during cure are mixed with nitrogen oxides in the presence of sunlight. Ozone is reported to cause pulmonary irritation on exposure, lower crop yields, retard tree growth, damage ornamental plants and shrubs, increase susceptibility to acid rain and insect damage, damage plastics, dyes and paints and lower visibility by formation of smog.

The present invention provides epoxy resins suitable for the preparation of castings, moldings, coatings and the like having an improvement in one or more of the properties selected from chemical resistance, flexibility and the like.

SUMMARY OF THE INVENTION

One aspect of the present invention pertains to modified epoxy resin resulting from reacting a composition comprising (A) at least one epoxy resin selected from the group consisting of
  (1) at least one epoxy resin having an average of more than one vicinal epoxy group per molecule;
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group;
    (b) at least one compound containing a secondary amine group: or
    (c) any combination of (a) and (b): and
  (3) any combination of (1) and (2):
(B) at least one tertiary amine-containing component selected from the group consisting of
  (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: or
  (2) a mixture of tertiary amine-containing compounds consisting essentially of
    (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: and
    (b) at least one compound containing only one tertiary amine group per molecule: and
(C) at least one Brönsted acid.

Another aspect of the present invention pertains to a curable non-aqueous composition comprising
(I) a modified epoxy resin resulting from reacting a composition comprising
  (A) at least one epoxy resin selected from the group consisting of
    (1) at least one epoxy resin having an average of more than one vicinal epoxy group per molecule;
    (2) at least one epoxy resin having an average of more than one vicinal epoxy group per molecule wherein from about 1 to about 85 percent of the vicinal epoxy groups have been reacted with
      (a) at least one compound containing an aromatic hydroxyl group;
      (b) at least one compound containing a secondary amine group; or
      (c) any combination of (a) and (b): and
    (3) any combination of (1) and (2);
  (B) at least one tertiary amine-containing component selected from the group consisting of
    (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: or
    (2) a mixture of tertiary amine-containing compounds consisting essentially of
      (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties; and
      (b) at least one compound containing only one tertiary amine group per molecule:
  (C) at least one Brönsted acid; and
(II) a curing amount of at least one curing agent.

A further aspect of the present invention pertains to aqueous compositions having dissolved or dispersed in water a modified epoxy resin resulting from reacting a composition comprising
(A) at least one epoxy resin selected from the group consisting of
  (1) at least one epoxy resin having an average of more than one vicinal epoxy group per molecule:
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group;
    (b) at least one compound containing a secondary amine group; or
    (c) any combination of (a) and (b); and
  (3) any combination of (1) and (2);
(B) at least one tertiary amine-containing component selected from the group consisting of
  (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: or (2) a mixture of tertiary amine-containing compounds consisting essentially of
  (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties; and
  (b) at least one compound containing only one tertiary amine group per molecule: and
(C) at least one Brönsted acid.

A further aspect of the present invention pertains to a curable aqueous composition having dissolved or dispersed in water a composition comprising
(I) a modified epoxy resin composition resulting from reacting
(A) at least one epoxy resin selected from the group consisting of
  (1) at least one epoxy resin having an average of more than one vicinal epoxy group per molecule:
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group;
    (b) at least one compound containing a secondary amine group; or
    (c) any combination of (a) and (b); and
  (3) any combination of (1) and (2);
(B) at least one tertiary amine-containing component selected from the group consisting of
  (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties; or
  (2) a mixture of tertiary amine-containing compounds consisting essentially of
    (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties; and
    (b) at least one compound containing only one tertiary amine group per molecule:
(C) at least one Brönsted acid; and
(11) a curing amount of at least one curing agent.

A further aspect of the present invention pertains to curable aqueous coating compositions which comprises the aforementioned curable aqueous compositions and one or more additives.

A further aspect of the present invention pertains to curable non-aqueous coating compositions which comprises the aforementioned curable non-aqueous compositions and one or more additives.

A still further aspect of the present invention pertains to articles coated with the aforementioned curable aqueous or non-aqueous coating compositions which composition has been cured subsequent to being applied to said article.

A still further aspect of the present invention pertains to the product resulting from curing any of the aforementioned curable compositions.

DETAILED DESCRIPTION OF THE INVENTION

The modified epoxy resin compositions of the present invention are conveniently prepared as solvent-borne or water-borne systems. The solvent-borne system is prepared by dissolving an epoxy resin in one or more suitable solvents and adding an organic solution of a mixture of the tertiary amine-containing compound and Brönsted acid. Useful compositions can also be prepared by first reacting the dissolved epoxy resin and an organic solution of the tertiary amine and then adding the acid and subsequently heating the reaction mixture to a suitable reaction temperature. The water-borne system is conveniently prepared by dissolving an epoxy resin in one or more suitable solvents and adding thereto an aqueous solution or dispersion of a mixture of the tertiary amine-containing compound and Brönsted acid. Useful compositions can also be produced by first reacting the epoxy resin and tertiary amine containing compound and then adding the acid and subsequently heating the reaction mixture to a suitable reaction temperature. If desirable, additional quantities of water can be added during the reaction. The particular temperature employed is not critical except that the temperature should be sufficient to cause a reaction between the components. Suitable temperatures include, for example, from about 25° C. to about 130° C., preferably from about 60 ° C. to about 100° C., more preferably from about 80° C. to about 100° C. At temperatures above about 130° C., gellation occurs. The duration or reaction time is also not critical so long as the reaction is conducted for a time sufficient to complete the reaction. Suitable reaction times for the solvent-borne system include, for example, from about 0.1 to about 24, preferably from about 0.1 to about 12, more preferably from about 0.1 to about 6, hours. Suitable reaction times for the water-borne system include, for example, from about 1 to about 48, preferably from about 5 to about 24, more preferably from about 7 to about 14, hours. Higher reaction temperatures require less time to complete the reaction whereas lower temperatures require more time to complete the reaction.

Suitable reaction solvents which can be employed include, for example, glycol ethers, glycol esters, alcohols, ketones, combinations thereof and the like. Particularly suitable such solvents include, for example, 2-butoxyethanol, diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol pheryl ether, 2,2,4-trimethyl-1,3-pentanediol monoisobutyrate, n-pentyl propionate, $C_6$ to $C_{13}$ alkyl acetates, butanol, acetone, methyl ethyl ketone, methyl isobutyl ketone, any combination thereof and the like.

Suitable epoxy resins which can be modified with the tertiary amine-containing compounds include, for example, those disclosed by Patrick H. Martin in U.S. Pat. No. 4,164,487 which is incorporated herein by reference in its entirety. Also included as suitable epoxy resins are the advanced epoxy resins prepared by reacting a diglycidyl ether of either an aliphatic diol or an aromatic diol with an aromatic diol. Also suitable are the polyglycidyl ethers of phenol- or halogen or alkyl substituted phenol-aldehyde novolac resins and the polyglycidyl ethers of reaction products of cycloalkyldienes, particularly dicyclopentadiene and higher oligomers of cyclopentadiene and phenol or halogen or alkyl or oxyalkyl derivatives of phenol. Particularly suitable epoxy resins include the diglycidyl ethers of bisphenol A, bisphenol F, bisphenol K or the halogenated particularly brominated, $C_1$ to $C_4$ alkylated or $C_1$ to $C_4$ alkoxylated derivatives thereof, as well as the advanced epoxy resins prepared by reacting these diglycidyl ethers with such bisphenols as bisphenol A, bisphenol F, bisphenol K, bisphenol S or the halogenated particularly brominated, $C_1$ to $C_4$ alkylated or $C_1$ to $C_4$ alkoxylated derivatives thereof.

Most particularly suitable such epoxy resins include those represented by the following formula

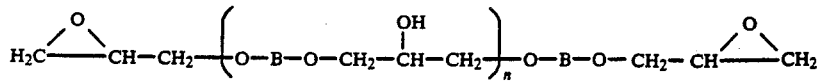

wherein each B is independently the residue remaining from the removal of the hydroxyl groups from biphenol or $C_1$ to $C_4$ alkyl or chlorine or bromine substituted biphenol or a bisphenol or $C_1$ to $C_4$ alkyl or chlorine or bromine substituted bisphenol; and n has a value from about zero to about 30, preferably from about 3 to about 20. Most particularly, B is the residue of bisphenol A, tetrabromobisphenol A, bisphenol F, tetrabromobisphenol F, bisphenol K or tetrabromobisphenol K.

Also suitable epoxy-containing compounds include any of the aforementioned epoxy resins wherein some of the epoxy groups have been reacted with a monophenol or substituted monophenol or such epoxy resins wherein some of the epoxy groups have been reacted with a secondary amine compound.

The epoxy-containing compounds and the phenol and/or secondary amine-containing compounds are employed in amounts which provide a ratio of phenolic hydroxyl groups and/or secondary amine groups per epoxy group of from about 0.01:1 to about 0.85:1, preferably from about 0.01:1 to about 0.6:1, more preferably from about 0.1:1 to about 0.3:1.

Normally, the epoxy-containing compounds are first reacted with the phenol and/or secondary amine-containing compounds and then with the acidified tertiary amine compound(s). Usually, the amounts of the phenol and/or secondary amine-containing compounds employed is chosen to limit the epoxy resin content to near zero after the desired charge density is obtained by reaction of the epoxy-containing compound with the acidified tertiary amine compound(s).

The reaction between the epoxy-containing compounds and the phenol and/or secondary amine-containing compounds can be conducted either in the presence or absence of any suitable solvent at any temperature sufficient to cause a reaction between the epoxy group and the phenolic hydroxyl group or secondary amine group for a time sufficient to complete the reaction. Particularly suitably temperatures for the reaction of the epoxy-containing compounds with the phenol include, for example, from about 50° C. to about 280° C., preferably from about 100° C. to about 240° C., more preferably from about 120° C. to about 220° C. and most preferably from about 120° C. to about 180° C. The higher temperatures require less reaction time than does the lower temperatures. However, suitable reaction times include, for example, from about 0.025 to about 24, preferably from about 0.05 to about 5, more preferably from about 0.1 to about 2, and most preferably from about 0.25 to about 1 hour can be employed.

Particularly suitable temperatures for the reaction between the epoxy-containing compounds and the secondary amine-containing compounds include, for example, from about 25° C. to about 200° C., more suitably from about 60° C. to about 150° C., most suitably from about 80° C. to about 125° C. At temperatures below about 60° C., the mixture becomes too viscous for adequate mixing. At temperatures above about 150° C., the tertiary amine species from the reaction of the secondary amine with the epoxy group of the epoxy resin catalyzes side reactions. The side reactions increase molecular weight and viscosity up to and including gellation. The reaction is suitably carried out for a time of from about 0.025 to about 8, more suitably from about 0.05 to about 2 and most suitably from about 0.25 to 1 hour(s). Higher reaction temperatures require less time than do lower reaction temperatures.

Suitable solvents which can be employed in the reaction between the epoxy-containing compound and the phenol or secondary amine-containing compound include, for example, aliphatic and aromatic hydrocarbons, glycol ethers, glycol esters, alcohols, ketones, cyclic ethers, combinations thereof and the like. Particularly suitable such solvents include, hexane, heptane, octane, nonane, decane, benzene, toluene, xylene, 2-bytoxyethanol, ethanol, propanol, butanol, pentanol, hexanol, heptanol, acetone, methyl ethyl ketone, dipropylene glycol methyl ether, diethylene glycol monobutyl ether, diethylene glycol methyl ether, diethylene glycol monopropyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monosiobutyrate, n-pentylpropionate, $C_6$ to $C_{13}$ alkyl acetates, any combination thereof and the like.

If desired, the reaction between the epoxy-containing compound and the phenol or substituted phenol or secondary amine-containing compound can be conducted in the presence of a catalytic amount of a suitable catalyst. Particularly suitable such catalysts include, phosphonium compounds, phosphines, quaternary ammonium compounds, tertiary amines, metal hydroxides, any combination thereof and the like. Particularly suitable such catalysts include, for example, ethyltriphenylphosphonium chloride, ethyltriphenylphosphonium bromide, ethyltriphenylphosphonium iodide, ethyltriphenylphosphonium acetate. acetic acid complex, ethyltriphenylphosphonium phosphate, tetrabutylphosphonium chloride, tetrabutylphosphonium bromide, tetrabutylphosphonium iodide, tetrabutylphosphonium acetate.acetic acid complex, tetrabutylphosphonium phosphate, triphenyl phosphine, N-methylmorpholine, sodium hydroxide, potassium hydroxide, tetrabutylammonium halide, benzyltrimethylammonium chloride, any combination thereof and the like.

Suitable monophenol compounds which can be employed herein include, for example those represented by the following formula

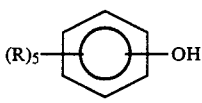

wherein each R is independently hydrogen, a halogen, particularly chlorine or bromine, a hydrocarbyl or hydrocarbyloxy group having from 1 to about 20, preferably from 1 to about 10, carbon atoms and which hydrocarbyl or hydrocarbyloxy groups can contain substitutent groups such as, for example, a nitro group, an alkyl or alkoxy group having from 1 to about 20, preferably from 1 to about 10, carbon atoms, and the like. Particularly suitable phenols include, for example, phenol, o-cresol, p-cresol, nonylphenol, chlorophenol, dichlorophenol, trichlorophenol, pentachlorophenol, bromophenol, dibromophenol, tribromophenol, trifluoro-m-cresol, 3-ethylphenol, 4-ethylphenol, 3-isopropylphenol, 4-n-propylphenol, 4-isopropylphenol, 3-tert-butylphenol, 4-sec-butylphenol, 4-tert-butylphenol, p-tert-amylphenol, 4-n-butoxyphenol, 4-heptyloxyphenol, 3,5-tert-butylphenol, 3-n-pentadecylphenol, o-methoxyphenol, m-methoxyphenol, 2-methoxy-4-methylphenol, 4-ethyl-2-methoxyphenol, 3,4-methylenedioxyphenol, mixtures thereof and the like.

Suitable secondary amine-containing compounds which can be employed herein include, for example, those represented by the following formulas

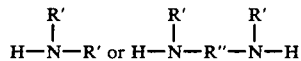

wherein each R' is independently a hydrocarbyl or hydrocarbyloxy group having from 1 to about 20, preferably from about 2 to about 10 carbon atoms, which hydrocarbyl or hydrocarbyloxy groups can contain substituent groups such as, for example, a nitro group, a hydroxyl group, or an alkyl group having from 1 to about 10 carbon atoms, and the like; and R" is a divalent hydrocarbyl group or a divalent hydrocarbyl group containing such substitutent groups as, for example, a nitro group, a hydroxyl group, or an alkyl group having from 1 to about 10 carbon atoms, and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the carbon atom to which it is attached.

Particularly suitable secondary amines include, for example, diethylamine, dipropylamine, dibutylamine, di-n-nonylamine, di-n-dodecylamine, N-methyl-n-octadecylamine, diethanolamine, methylethanolamine, ethylethanolamine, bis(methoxyethyl)amine, bis(methoxypropyl)amine, bis(butoxyethyl)amine, bis(butoxypropyl)amine, piperidine, 4-ethylpiperdine, 2-piperidinethanol, piperazine, 3-piperidinemethanol, N-methylcyclohexylamine, N,N'-dimethylethylenediamine, N,N'-diethylethylenediamine, N,N'-bis(2-hydroxyethyl)-ethylenediamine, 4,4'-bipiperidine, 4,4'-ehtylene-dipiperidine, 4,4'-trimethylenedipiperidine, mixtures thereof and the like. Secondary monomaines are the preferred amines.

Suitable polytertiary amine-containing compounds which can be employed herein include any compound having more than one tertiary amine group per molecule. Particularly suitable polytertiary amine-containing compounds include those represented by the following formulas,

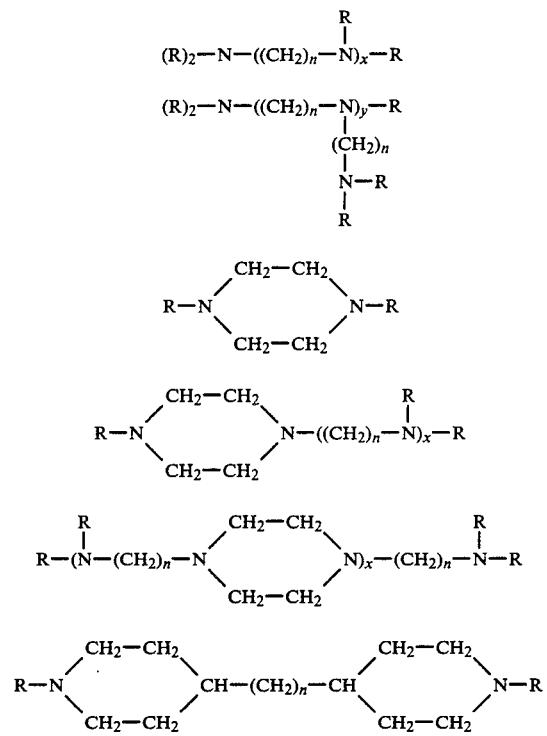

wherein each R is independently an alkyl group having from 1 to about 10 carbon atoms, preferably from 1 to about 4 carbon atoms; n has a value from 1 to about 20; x has a value from 1 to about 10, preferably from 1 to about 2; and y has a value from 2 to about 10, preferably from about 2 to about 4.

Preferably, polytertiary amines which can be employed herein include N,N,N',N'-tetramethylethylenediamine, N,N,N',N'-tetramethyl-1,3-propanediamine, N,N,N',N'-tetramethyl-1,4- butanediamine, N,N,N',N'-tetramethyl-1,6-hexanediamine, N,N,N', N'-tetramethyldiaminomethane, bis-(2-dimethylaminoethyl)-methylamine, 4,4'-trimethylenebis(1-methylpiperidine), 1,4-dimethylpiperazine, mixtures thereof and the like. The most preferred polytertiary amines include N,N,N',N'-tetramethylethylenediamine, N,N,N',N'-tetramethyl-1,6-hexanediamine, 4,4'-trimethylenebis(1methylpiperidine) or any combination thereof.

The polytertiary amines can be mixed with monotertiary amines such as trimethylamine, triethylamine, tri-n-propylamine, N,N-dimethylethanolamine, butyldimethylamine, N,N,N-dimethylphenethylamine, N-methylpiperidine, mixtures thereof and the like.

The polytertiary amine-containing compound and monotertiary amine-containing compound can be employed in any proportion so long as both are present. Preferably, the polytertiary amine-containing compound is employed in an amount of from about 10 to about 99, more preferably from about 50 to about 99, most preferably from about 75 to about 99 percent by weight based upon the combined weight of the polytertiary amine-containing compound and the monotertiary amine-containing compound: and the monotertiary amine-containing compound is employed in an amount of from about 1 to about 90, more preferably from about 1 to about 50, most preferably from about 1 to about 25 percent by weight based upon the combined weight of the polytertiary amine-containing compound and the monotertiary amine-containing compound.

The polytertiary amine-containing compounds or mixture of polytertiary amine-containing compounds and monotertiary amine-containing compounds, component (B), are employed in an amount which provides a ratio of tertiary amine groups contained in component (B) per epoxy group contained in component (A) of from about 0.15:1 to about 1.1:1, preferably from about 0.4:1 to about 1:1, more preferably from about 0.7:1 to about 0.9:1.

The charge density of the solid resin is used to determine the quantity of tertiary amine groups per epoxy group. The charge density is the milliequivalents of tertiary amine-containing compound per gram of solid. A larger charge density is required for a high molecular weight epoxy resin than for a low molecular weight epoxy resin to obtain a dispersion. For the same molecular weight epoxy resin, a low charge density gives an aqueous dispersion whereas a higher charge density may give an aqueous solution. The charge density can vary from about 0.08 to about 1.4, preferably from about 0.35 to about 0.6, more preferably from about 0.35 to 0.45 milliequivalents of tertiary amine-containing compound per gram of solid.

Suitable Brönsted acids which can be employed herein include any such acid or combination of acids which promotes the reaction between the tertiary amine-containing compound and the epoxide group and provide a compatible anion in the final product. Monobasic acids are usually preferred. Suitable inorganic acids which can be employed herein include, for example, phosphoric acid, hydrochloric acid, hydrobromic acid, nitric acid, sulfuric acid, any combination thereof and the like. Suitable organic acids which can be employed herein include, for example, those saturated or unsaturated acids having from about 2 to about 30 carbon atoms. Particularly suitable acids include, for example, acetic acid, propionic acid, acrylic acid, methacrylic acid, methacrylic acid, itaconic acid, maleic acid, glycolic acid, lactic acid, citric acid, ethanesulfonic acid, decanoic acid, triacontanoic acid, any combination thereof and the like.

The Brönsted acid is employed in an amount which provides from about 0.2 to about 10, preferably from about 0.5 to about 1.5, more preferably from about 1 to about 1.1, moles of acid per tertiary amine group.

The ratio of epoxy-containing reactant/polytertiary amine reactant/Brönsted acid is variable so long as the reaction mixture is at a neutral or acid pH. Stoichiometry of the reaction requires 1 equivalent of polytertiary amine and 1 equivalent of acid per vicinal epoxy group converted. In order to form the instant polytertiary amine compounds from strong acids, an excess of the polytertiary amine is required. With weaker acids, good results can be achieved by using substantially stoichiometric amounts of reactants although a slight excess or deficiency of the epoxy-containing reactant or polytertiary amine can be used. With still weaker acids a slight excess of acid is preferred to maximize the yield of polytertiary amine salts. Good results have been achieved using a ratio of about 1.1 equivalents of weak acid and one equivalent of polytertiary amine per epoxy equivalent.

The amount of water that is included in the reaction mixture for water-borne compositions can be varied to convenience so long as there is sufficient acid and water present to stabilize the polytertiary amine salt formed during the course of the reaction. Normally, it has been found preferably to include water in the reaction in amounts of from about 10 to about 30 moles per epoxy equivalent.

If desired, the aqueous compositions of the present invention can also contain minor amounts of an organic solvent such as, for example, glycol ethers, ketones, carboxylates, combinations thereof and the like. Particularly suitable such solvents include, for example, ethylene glycol monobutyl ether, ethylene glycol monomethyl ether, diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monoisobutyrate, n-pentyl propionate, $C_6$ to $C_{13}$ alkyl acetates, butanol, acetone, methyl ethyl ketone, methyl isobutyl ketone, any combination thereof and the like. Particularly suitable such solvents include, for example, ethylene glycol monobutyl ether (2-butoxyethanol), ethylene glycol monomethyl ether (2-methoxyethanol), butanol, any combination thereof and the like.

These solvents are employed in amounts of from about 1 to about 35, preferably from about 5 to about 10, more preferably from about 5 to about 7, percent by weight based upon the weight of the aqueous dispersion.

Suitable curing agents which can be employed in the curable compositions of the present invention include, for example, urea-aldehyde resins, alkylated urea-aldehyde resins, melamine-aldehyde resins, alkylated melamine-aldehyde resins, phenol-aldehyde resins, alkylated phenol-aldehyde resins, blocked isocyanates, combinations thereof and the like. Suitable blocked isocyanates which can be employed herein as curing agents include, for example, those described in U.S. Pat. No. 3,959,106 to Bosso et al which is incorporated herein by reference in its entirety. Particularly, suitable curing agents include, for example, hexamethoxymethylmelamine, highly methylated melamine-formaldehyde resin, highly alkylated ethoxy methoxy melamine-formaldehyde resin and highly alkylated methoxymethyl, isobutoxymethyl melamine-formaldehyde resin commercially available as CYMEL 303, CYMEL 325, CYMEL 1116 and CYMEL 1161, respectively from the American Cyanamide Co.: RESIMENE 730 and RESIMENE 735 melamine-formaldehyde solutions commercially available from Monsanto Co.; BEETLE 60 and BEETLE 65 ureaformaldehyde resins commercially available from the American Cyanamide Co.; a mixture of the allyl ethers of mono-, di-, and tri-methylol phenols, a mixture of allyl ethers of methylol phenol partially polymerized and phenol-formaldehyde synthetic resin, commercially available as METHYLON 75-108, METHYLON 75-121 and VARCUM SYNTHETIC RESIN 29-101 available from BTL Specialty Resins Corp., 2-ethylhexanol blocked prepolymer of toluene diisocyanate and trimethylol propane, 2-ethylhexanol blocked prepolymer of diphenylmethane 4,4-diisocyanate, diethylene glycol and tripropylene glycol, mixtures thereof and the like.

The curing agents are suitably employed in amounts sufficient to cure the resultant product into an insoluble and infusable product. The curing agents are usually employed in amounts suitably from about 1 to about 50, more suitably from 5 to about 30, most suitably from about 10 to about 25, percent by weight based upon the weight of the modified epoxy resin.

If desired, promoters or accelerators can be employed with the urea-aldehyde resins, alkylated urea-aldehyde resins, melamine-aldehyde resins, alkylated melamine-aldehyde resins, phenol-aldehyde resins or alkylated phenol-aldehyde resins. Suitable such accelerators or promoters include. for example, phosphoric acid, polyphosphoric acid, maleic acid, citric acid, organic sulfonic acids such as for example, benzene sulfonic acid, p-toluene sulfonic acid, mixtures thereof and the like.

If desired, the coating composition can be formulated with conventional additives. Suitable such additives include, for example, antifoam agents, flow control agents, slip agents, adhesion promoters, flexibility promoters, surface tension modifiers, stress release agents, gloss reducing materials, rheology modifiers, stabilizers, surfactants, coalescing solvents, reactive diluents, plasticizers and the like. A partial list of suitable additives, include, for example, methacrylamide functional amine adduct of neopentyl(diallyl)oxy, tri(dioctyl)pyro-phosphato titanate which is commercially available from Kenrich Petrochemicals, Inc. as LICA 38J; methacrylamide functional amine adduct of neopentyl(diallyl)oxy, tri(dioctyl)pyro-phosphato zirconate which is commercially available from Kenrich Petrochemicals, Inc. as LZ 38J; a solution of polyether modified methyl alkyl polysiloxanes which is commercially available from BYK-Chemie as BYK-321: a solution of polyether modified dimethyl polysiloxanes which is commercially available from BYK-Chemie as BYK-306: and a silicone resin solution which is commercially available as SR882M from General Electric.

The coating compositions can be pigmented and/or opacified with known pigments and opacifiers. For many uses, including food uses, the preferred pigment is titanium dioxide. Generally, the pigment is used in a pigment to binder ratio of from about 0.1:1 to about 1:1 by weight. Other pigments include, antimony oxide, zinc oxide, white lead, calcium carbonate, silica, aluminum silicate, magnesium silicate, aluminum potassium silicate, any combination thereof and the like.

The modified epoxy resins of the present invention can be employed to prepare castings, moldings, coatings, and the like.

The coating compositions can be applied by any conventional method known in the coating industry. Therefore, spraying, rolling, dipping, flow control or electrodeposition applications can be employed for both clear and pigmented films. Spraying and electrodeposition are the preferred methods for applying the aqueous coating compositions of the present invention. After application onto the substrate, the coating is thermally cured at temperatures of from about 95° C. to about 235° C. or higher, for periods in the range of from about 1 to 60 minutes. The resultant films can be dried at ambient temperatures for longer periods of time.

The following examples are illustrative of the invention, but are not to be construed as to limiting the scope thereof in any manner.

EXAMPLE 1

A diglycidyl ether of bisphenol A epoxy resin having an epoxide equivalent weight of 932 (commercially available from The Dow Chemical Company as D.E.R. TM 664 (220 grams, 0.2360 equivalent) and 55.1 grams of 2-butoxyethanol (0.466 mole) are added to a five neck 1 liter glass flask equipped with a means for purging nitrogen. temperature control, stirring, condensing and reactant addition. The resin is slowly dissolved by heating to 127° C. Once the resin is dissolved, the nitrogen adapter having no dip leg is replaced with one having a four inch (101.6 mm) dip leg to obtain vigorous bubbling action below the surface. Then the resin is cooled to 90° C. In an eight ounce (237 ml) bottle is mixed 107.0 grams (5.9 moles) deionized water, 21.19 grams (0.089 mole) 4,4'-trimethylenebis(1-methylpiperidine), and 23.9 grams (0.226 mole) of an 85% aqueous solution of lactic acid. This solution is then added dropwise over a period of 35 minutes while maintaining the reaction temperature between 81° C. and 90° C. The mixture is stirred between 90° C. and 95° C. for an additional seven hours and 9 minutes. Then 557 grams deionized water is added to the reactor contents over a thirty-seven minute period while maintaining the reaction temperature between 80° C. and 96° C. The transparent orange brown colored aqueous solution with a non-volatile content of 25 percent and charge density of 0.68 milliequivalents/gram resin is allowed to cool to ambient temperature with stirring. The pH of the stable aqueous solution is 4.3. The viscosity measured with a No. 4 Ford Cup is 20.6 seconds. The volatile organic content of the solution is 1.5 pounds per gallon (178 grams/liter).

EXAMPLE 2

Coatings are prepared by blending 54.7 grams of the aqueous solution prepared in Example 1, with 3.47 grams of Cymel 325, 0.0620 grams of SR882M and 2.09 grams deionized water to give a formulation containing 25 3 parts per hundred parts by weight resin (phr) of Cymel 325. Cymel 325 is a high imino (—NH) melamineformaldehyde resin which is commercially available from the American Cyanamid Co. SR882M is a silicone resin solution which is commercially available from the General Electric company. The coating is applied to 24 gauge ×4 inches ×12 inches (0.66 mm×101.6 mm×304.8 mm) unpolished clean-treated cold rolled steel panels with a No. 22 wire wound rod according to ASTM D 4147–82. The coated panels are baked in an oven at 400° F. (204 4° C.) for 10 minutes. The thickness of the coating is between 0.27 mil (0.0069 mm) and 0.30 mil (0.0076 mm).

EXAMPLE 3

A diglycidyl ether of bisphenol A epoxy resin (commercially available from the Dow Chemical Company as D.E.R. 667) having an epoxide equivalent weight of 1755 (220 grams, 0.1254 equivalents) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch (101.6 mm) dip leg to obtain vigorous bubbling action below the surface. Then the resin is cooled to 90° C. In a four ounce (118 ml) bottle is mixed 56.6 grams (3.1 moles) deionized water, 11.23 /grams (0.0471 mole) 4,4'-trimethylenebis(1-methylpiperidine), and 12.6 grams (0.119 mole) of an 85% aqueous solution of lactic acid. This solution is then added dropwise over a period of 17 minutes while maintaining the reaction temperature between 80° C. and 93.5° C. The white mixture is stirred between 88° C. and 95° C. for an additional seven hours. Then 573.9 grams deionized water is added to the reactor contents over a twenty-six minute period. The transparent tan colored aqueous solution with a non-volatile content of 25 percent and charge density of 0.39 milliequivalents/gram resin is allowed to cool to ambient temperature with stirring. The pH of the stable aqueous dispersion is 4.4. The viscosity which is measured with a No. 4 Ford Cup is 12.5 seconds. The volatile organic content of the solution is 1.6 pounds per gallon (192 grams/liter).

EXAMPLE 4

Coatings are prepared by blending 53.3 grams of the aqueous solution prepared in Example 3, with 2.67 grams of Cymel 325 to give a formulation containing 20.1 phr Cymel 325. The coating is applied to 24 gauge ×4 inches ×12 inches (0.66 mm×101.6 mm×304.8 mm) unpolished clean-treated cold rolled steel panels with a No. 22 wire wound rod. The coated panels are baked in an oven at 400° F. (204.4° C.) for 10 minutes. The thickness of the coating is between 0.24 mil (0.0061 mm) and 0.28 mil (0.0071 mm).

EXAMPLE 5

Coatings are prepared by blending 51.2 grams of the aqueous solution prepared in Example 3, with 3.26 grams of Cymel 325 to give a formulation containing 25.5 phr Cymel 325. The coating is applied to 24 gauge ×4 inches ×12 inches (0.66 mm×101.6 mm×304.8 mm) unpolished clean-treated cold rolled steel panels with a No. 22 wire wound rod. The coated panels are baked in an oven at 400° F. (204.4° C.) for 10 minutes. The thickness of the coating is between 0.26 mil (0.0066 mm) and 0.29 (0.0074) mil.

EXAMPLE 6

A diglycidyl ether of bisphenol A epoxy resin having an epoxide equivalent weight of 1755 (220 grams, 0.1254 equivalent) and 55.0 grams (0.465 mole) of 2-butoxyethanol are added to reactor of the type described in Example 1. The resin is slowly dissolved by heating to 125° C. Once the resin is dissolved, the nitrogen adapter is replaced with one having a four inch (101.6 mm) dip leg to obtain vigorous bubbling action below the surface. Then the resin is cooled to 82° C. In a four ounce (118 ml) bottle is mixed 56.6 grams (3.1 moles) deionized water, 5.47 grams ( 0.0471 mole) N,N,N',N'-tetramethylethylenediamine, and 12.64 grams (0.119 mole) of an 85% aqueous solution of lactic acid. This solution is then added dropwise over a period of 22 minutes while maintaining the reaction temperature between 70° C. and 82° C. The mixture is stirred between 71° C. and 81° C. for 4 hours and between 87° C. and 92° C. for 7 more hours. Then 390.8 grams deionized water is added to the reactor contents over a 22 minute period while maintaining the reaction temperature between 70° C. and 91° C. The white aqueous dispersion with a non-volatile content of 30 percent and charge density of 0.40 milliequivalents/gram resin is allowed to cool to ambient temperature with stirring. After dilution to 20 percent by weight non-volatiles, the pH of the stable aqueous dispersion is 4.6 and the viscosity which is measured with a No. 4 Ford Cup is 15.5 seconds. The volatile organic content of the dispersion is 1.6 pounds per gallon (192 grams/liter).

EXAMPLE 7

Coatings are prepared by blending 60.2 grams of the aqueous solution prepared in Example 6, with 2.47 grams of Cymel 325 to give a formulation containing 20.5 phr Cymel 325. The coating is applied to 24 gauge ×4 inches ×12 inches (0.66 mm×101.6 mm×304.8 mm) unpolished clean-treated cold rolled steel panels with a No. 22 wire wound rod. The coated panels are baked in an oven at 400° F. (204.4° C.) for 10 minutes. The thickness of the coating is between 0.18 mil (0.0046 mm) and 0.21 mil (0.0053 mm).

EXAMPLE 8

Coatings are prepared by blending 59.2 grams of the aqueous solution prepared in Example 6, with 3.04 grams Cymel 325 and 0.125 grams BYK-320 to give a formulation containing 25.65 phr Cymel 325 and 0.20% BYK-320. BYK-320 is a polyether modified methylalkyl polysiloxane copolymer which is commercially available from BYK-Chemie which is employed as a surface tension modifier. The coating is applied to 24 gauge ×4 inches ×12 inches (0.66 mm×101.6 mm×304.8 mm) unpolished clean-treated cold rolled steel panels with a No. 22 wire wound rod. The coated panels are baked in an oven at 400° F. (204.4° C.) for 10 minutes. The thickness of the coating is 0.21 mil (0.0053 mm).

EXAMPLE 9

A diglycidyl ether of bisphenol A epoxy resin having an epoxide equivalent weight of 1755 (220 grams, 0.1254 equivalent) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the reactor contents are cooled to 90° C. In a four ounce (118 ml) bottle is mixed 56.7 grams (3.15 moles) deionized water, 8.12 grams (0.0471 mole) N,N,N',N'-tetramethyl-1,6-hexanediamine, and 12.68 grams (0.120 mole) of an 85% aqueous solution of lactic acid. This solution is then added dropwise over a period of 33 minutes while maintaining the reaction temperature at 90° C. The mixture is stirred between 90° C. and 95° C. for 6 hours 21 minutes. Then 494.1 grams deionized water is added to the reactor contents over a 44 minute period between 80° C. and 92° C. The white colored aqueous dispersion with a non-volatile content of 27 weight percent and charge density of 0.39 milliequivalents/gram resin is allowed to cool with stirring. After dilution to 25 weight percent non-volatiles, the pH of the stable aqueous dispersion is 4.7 and the viscosity which is measured with a Ford Cup No. 4 is 12.8 seconds. The volatile organic content of the dispersion is 1.6 pounds per gallon (192 grams/liter).

EXAMPLE 10

Coatings are prepared by blending 59.1 grams of the aqueous dispersion prepared in Example 9, with 2.36 grams Cymel 325 to give a formulation containing 20.0 phr Cymel 325. The coating is applied to 24 gauge ×4 inches ×12 inches (0.66 mm×101.6 mm×304.8 mm) unpolished clean-treated cold rolled steel panels with a No. 22 wire wound rod. The coating is baked in an oven at 400° F. (204.4° C.) for 10 minutes. The thickness of the coating is between 0.20 mil (0.00508 mm) and 0.22 mil (0.005588 mm).

EXAMPLE 11

Coatings are prepared by blending 54.2 grams of the aqueous dispersion prepared in Example 9, with 2.80 grams Cymel 325 to give a formulation containing 25.8 phr Cymel 325. The coating is applied to 24 gauge ×4 inches ×12 inches (0.66 mm×101.6 mm×304.8 mm) unpolished clean-treated cold rolled steel panels with a No. 22 wire wound rod. The coating is baked in an oven at 400° F. (204.4° C.) for 10 minutes. The thickness of the coating is between 0.21 mil (0.0053 mm) and 0.24 mil (0.0061 mm).

EXAMPLE 12

A diglycidyl ether of bisphenol A epoxy resin (commercially available from the Dow Chemical Company as D.E.R. 669 E) having an epoxide equivalent weight of 4772 (220 grams, 0.0461 equivalent) and 90.5 grams (0.766 mole) of 2-butoxyethanol are added to a reactor of the type described in Example 1. The resin is slowly dissolved by heating to 137° C. Once the resin is dissolved, the nitrogen adapter is replaced with one having a four inch (101.6 mm) dip leg to obtain vigorous bubbling action below the surface. Then the reactor contents are cooled to 97° C. In a four ounce (118 ml) bottle is mixed 20.8 grams (1.2 moles) deionized water, 3.98 grams (0.0231 mole) N,N,N',N'-tetramethyl-1,6-hexanediamine, and 4.89 grams (0.0461 mole) of an 85% aqueous solution of lactic acid. This solution is then added dropwise over a period of six minutes while maintaining the reaction temperature between 89° C. and 97° C. The mixture is stirred between 90° C. and 100° C. for 1 hour and 25 minutes. Then 20.1 grams ethylene glycol n-butyl ether and 687.8 grams deionized water is added to the reactor contents over a twenty-three minute period. The white colored aqueous dispersion with a non-volatile content of 22 percent and charge density of 0.20 milliequivalents/gram resin is allowed to cool with stirring. After dilution to 20 weight percent non-volatiles with deionized water, the white aqueous dispersion is filtered with a medium paint strainer. The pH is 5.1 and the viscosity which is measured with a No. 4 Ford Cup is 17.5 seconds. The volatile organic content of the dispersion is 2.8 pounds per gallon (336 grams/liter).

EXAMPLE 13

Coatings are prepared by blending 56.4 grams of the aqueous solution prepared in Example 12, with 2.86 grams of Cymel 325 to give a formulation containing 25.4 phr Cymel 325. The coating as applied to 24 gauge ×4 inches ×12 inches (0.66 mm×101.6 mm×304.8 mm) unpolished clean-treated cold rolled steel panels with a No. 22 wire wound rod according to ASTM D 4147-82. The coated panels are baked in an oven at 400° F. (204.4° C.) for 10 minutes. The thickness of the coating is between 0.23 mil (0.0058 mm) and 0.28 mil (0.0071 mm).

EXAMPLE 14

A diglycidyl ether of bisphenol A epoxy resin with an epoxide equivalent weight of 932 (220 grams, 0.2360 equivalent) and 55.1 grams of 2-butoxyethanol (0.466 mole) are added to a reactor of the type described in Example 1. The resin is heated to 143° C. Then the temperature is lowered to 123° C. and maintained between 117° C. and 123° C. for twenty-five minutes. Once the resin is dissolved, the nitrogen adapter with no dip leg is replaced with one having a four-inch dip leg to obtain vigorous bubbling action below the surface. Then the resin is cooled to 87° C. In a four-ounce bottle is mixed 56.6 grams deionized water (3.1 moles), 12.16 grams 1,4-dimethylpiperazine (0.106 mole), and 27.7 grams of an aqueous solution of 85% lactic acid (0.261 mole). This solution is then added dropwise over a period of 55 minutes while maintaining the reaction temperature at 87° C. The mixture is stirred between 87° C and 90° C. for an additional 12 hours and nineteen minutes. Then 790.9 grams deionized water is added to the white reactor contents over a 47-minute period while maintaining the reaction temperature between 58° C. and 89° C. The white colored aqueous solution is diluted further with deionized water to give a dispersion with a non-volatile content of 18 percent and charge density of 0.83 millimole/gram resin. The aqueous solution is allowed to cool with stirring. The pH of the stable aqueous solution is 3.9. The viscosity which is measured with a Ford Cup No. 4 is 113 seconds. The volatile organic content of the solution is 1.5 pounds per gallon (178 grams/liter).

EXAMPLE 15

A diglycidyl ether of bisphenol A epoxy resin with an epoxide equivalent weight of 1755 (220 grams, 0.1254 equivalent) and 55.1 grams of 2-butoxyethanol (0.466 mole) are added to a reactor of the type described in Example 1. The resin is slowly dissolved by heating to 125° C. Once the resin is dissolved, the nitrogen adapter with no dip leg is replaced with one having a four-inch dip leg to obtain vigorous bubbling action below the surface. Then the resin is cooled to 90° C. In a four-ounce bottle is mixed 56.7 grams deionized water (3.15 moles), 5.42 grams N,N,N',N'-tetramethyl-1,6-hexanediamine (0.0315 mole), 2.81 grams N,N-dimethylethanolamine (0.0315 mole) and 7.20 grams of glacial acetic acid (0.120 mole). This solution is then added dropwise over a period of twenty-three minutes while maintaining the reaction temperature between 82° C. and 90° C. The mixture is stirred between 90° C. and 95° C. for an additional seven hours and five minutes. Then 521.8 grams deionized water is added to the white reactor contents over a twenty-nine minute period while maintaining the reaction temperature between 80° C. and 95° C. The white colored aqueous dispersion with a non-volatile content of 27 percent and charge density of 0.40 millimole/gram resin is allowed to cool with stirring. The pH of the stable aqueous dispersion is 5.4. The viscosity which is measured with a Ford Cup No. 4 is 17.9 seconds. The volatile organic content of the dispersion is 1.6 pounds per gallon (192 grams/liter).

EXAMPLE 16

A diglyoidyl ether of bisphenol A epoxy resin with an epoxide equivalent weight of 1755 (220.1 grams, 0.1254 equivalent) and 55.1 grams of 2-butoxyethanol (0.466 mole) are added to a reactor of the type described in Example 1. The resin is slowly dissolved by heating to 122° C. Once the resin is dissolved, the nitrogen adapter with no dip leg is replaced with one having a four-inch dip leg to obtain vigorous bubbling action below the surface. Then 3.34 grams diethanolamine (0.0318 mole) and 1.02 grams 2-butoxyethanol (0.0087 mole) are added to the reactor contents. The temperature is maintained between 120° C and 122° C. for a period of thirty-four minutes. Then the resin is cooled to 85° C. In a four-ounce bottle is mixed 56.6 grams deionized water (3.15 moles), 8.66 grams N,N,N',N'-tetramethyl-1,6-hexanediamine (0.0503 mole) and 7.25 grams of glacial acetic acid (0.121 mole). This solution is then added dropwise over a period of twenty-four minutes while maintaining the reaction temperature between 81° C. and 89° C. The mixture is stirred between 90° C. and 92° C. for an additional seven hours. Then 605.8 grams deionized water is added to the white reactor contents over a thirty-six minutes period while maintaining the reaction temperature between 88° C and 90° C. The white colored aqueous dispersion with a non-volatile content of 25 percent and charge density of 0.39 millimole/gram resin is allowed to cool with stirring. The pH of the stable aqueous dispersion is 6.4. The viscosity which is measured with a Ford Cup No. 4 is 22 seconds. The volatile organic content of the dispersion is 1.6 pounds per gallon (192 grams/liter).

EXAMPLE 17

A diglycidyl ether of bisphenol A epoxy resin with an epoxide equivalent weight of 1755 (220.1 grams, 0.1254 equivalent) and 55.0 grams of 2-butoxyethanol (0.465 mole) are added to a reactor of the type described in Example 1. The resin is slowly dissolved by heating to 120° C. Once the resin is dissolved, the nitrogen adapter with no dip leg is replaced with one having a four-inch dip leg to obtain vigorous bubbling action below the surface. A solution of 6.92 grams nonylphenol (0.0314 mole) and 0.2101 gram of a 70 percent by weight solution in methanol of tetrabutylphosphonium acetate.acetic acid complex (A2 catalyst) is added dropwise over a period of five minutes between 117° C. and 120° C. Then the reactor contents are heated between 150° C. and 152° C. for sixty-three minutes. The reactor contents are cooled to 91° C. In a four-ounce bottle is mixed 56.5 grams deionized water (3.14 moles), 11.99 grams 4,4'-trimethylenebis(1-methylpiperidine) (0.0503 mole), and 12.69 grams of an aqueous solution of 85% lactic acid (0.142 mole). This solution is then added dropwise over a period of twenty minutes while maintaining the reaction temperature between 80° C. and 94° C. The mixture is stirred at 95° C. for an additional seven hours and three minutes. Then 470.1 grams deionized water is added to the white reactor contents over a fifteen minute period while maintaining the reaction temperature at 90° C. The white colored aqueous dispersion is further diluted with deionized water to give a dispersion with a non-volatile content of 22.6 percent and charge density of 0.40 millimole/gram resin. The aqueous dispersion is allowed to cool with stirring. The pH of the stable aqueous dispersion is 4.25. The viscosity which is measured with a Ford Cup No. 4 is 11.6 seconds. The volatile organic content of the dispersion is 1.6 pounds per gallon (192 grams/liter).

EXAMPLE 18

A diglycidyl ether of bisphenol A epoxy resin with an epoxide equivalent weight of 932 (220 grams, 0.2360 equivalent) and 55.0 grams of 2-butoxyethanol (0.465 mole) are added to a reactor of the type described in Example 1. The resin is slowly dissolved by heating to 120° C. Once the resin is dissolved, the nitrogen adapter with no dip leg is replaced with one having a four-inch dip leg to obtain vigorous bubbling action below the surface. Then the resin is cooled to 85° C. In a four-ounce bottle is mixed 55.4 grams 2-butoxyethanol (0.469 mole), 10.20 grams N,N,N',N'-tetramethyl-1,6-hexanediamine (0.0592 mole), and 13.48 grams glacial acetic acid (0.224 mole). This solution is then added dropwise over a period of fifty minutes while maintaining the reaction temperature at 85° C. The mixture is stirred between 85° C. and 105° C. for thirty-one minutes and at 86° C. for an additional five hours and 27 minutes. Then 586.9 grams of 2-butoxyethanol is added to the light brown transparent reactor contents over a 10-minute period while maintaining the reaction temperature between 64° C. and 85° C. The yellow brown colored transparent solution with a non-volatile content of 26 percent and charge density of 0.49 millimole/gram resin is allowed to cool with stirring. The viscosity which is measured with a Ford Cup No. 4 is 67 seconds.

EXAMPLE 19

Coatings prepared in Examples 2, 4, 5, 7. 8, 10, 11 and 13 are subjected to one or more of the following tests. The results are provided in Table 1.

ADHESION

Adhesion is determined by the cross-cut tape test according to ASTM D 3359-87 method B. The tape used is Permacel 99. The adhesion tape test is performed by using the Gardco R Paint Adhesion Test Kit manufactured by Paul N. Gardner Company, Inc. The cutter blade is equipped with the coarse blade which has six teeth spaced 2.0 mm apart.

METHYL ETHYL KETONE (MEK) RESISTANCE

The resistance of the cured coating to removal with methyl ethyl ketone is determined by rubbing across the baked panels a two pound ball pein hammer with the ball end covered with eight layers of cheesecloth which has been saturated with methyl ethyl ketone (MEK). No force is applied to the hammer other than that necessary to guide the hammer back and forth over the same area. A forward and reverse stroke returning to the starting point is considered as being one MEK double rub. MEK resistance is related to the number of MEK double rubs. The amount of MEK double rubs requirement for a pass varies according to different coating applications. The National Coil Coaters Association (NCCA) recommend 25 MEK double rubs as being adequate for a pass in most applications.

IMPACT RESISTANCE

Coated panels are subjected to the impact of a falling weight from a Gardner Impact Tester at different calibrated heights ranging from 0 to 160 inch-pounds (0–18.1 J). The panel is inserted beneath the impact rod where the impact rod strikes the uncoated side of the panel. The impacted area is then tested for adhesion by taping with Scotch 610 tape. The tape is applied in such a manner where no air bubbles are trapped under the tape. The tape is then pulled with a rapid and forceful fashion at a 90 degree angle in an attempt to pull the coating away from the substrate.

T-BEND

T-Bend is used as a measure of the flexibility of the coating on the panel. T-Bend flexibility is measured according to ASTM-83. The edges of the panel is cut to leave a two inches (50.8 mm) wide by twelve inches (304.8 mm) long specimen of uniform thickness. A line is scribed or marked at approximately 0.75 inch (19.05 mm) from the end of the coated panel on the uncoated side of the panel. A bend is made in the panel at approximately 0.75 inch (19.05 mm) from the end of the coated panel by using a fingerbrake so that the coating is on the outside of the specimen after it is bent. The bend is squeezed tighter with the palm of the hand.

Then the bent specimen is placed in a vice, which is fitted with brass vise jaw clamps to prevent scratching the substrate, and the panel is bent back on itself to form a 180 degree bend. The stressed area is then tested for adhesion by taping with Scotch 610 tape. The tape is applied in such a manner where no air bubbles are trapped under the tape. The tape is then pulled with a rapid and forceful fashion at a 90 degree angle in an attempt to pull the coating away from the substrate. Then the bent specimen is dipped into a 500 ml beaker containing a solution of copper sulfate (10 grams) in 1.0 N hydrochloric acid for thirty minutes and then a 500 ml beaker of deionized water.

The purpose of this step is to oxidize any resulting bare metal in order to more accurately observe adhesion failures. The specimen is examined under a table-top illuminated magnification system with lenses having a total of 11 diopter power to determine failure. The first bend id noted as T0 because there is no panel sandwiched between the bend. The process of bending the panel by using the fingerbrake and vice is continued until there is no sign of cracking or adhesion loss. Each successive bend is noted as T1, T2, T3, T4, etc. because of the number of layers of panel sandwiched between plys. The lower the number of t-bends, the better the flexibility.

The following table shows some of the tests performed on the resultant coated panels and the result of the tests.

TABLE I

COATING PROPERTIES

| BASE AQUEOUS DISPERSION | CYMEL 325 (phr) | MEK DR | T-BEND | REVERSE IMPACT in.-lbs (J) |
|---|---|---|---|---|
| Example 2 | 25.3 | >301 | T5 | 60 (6.8) |
| Example 4 | 20.1 | 30 | T4 | 100 (11.3) |
| Example 5 | 25.5 | 90 | T4 | 76 (8.6) |
| Example 7 | 20.5 | 55 | T4 | 84 (9.5) |
| Example 8 | 25.7 | 200 | T6 | 88 (9.9) |
| Example 10 | 20 | 35 | T4 | 80 (9.0) |
| Example 11 | 25.8 | 50 | T5 | 76 (8.6) |
| Example 13 | 25.4 | 35 | T8 | 48 (5.4) |

All of the above coatings exhibited 5B cross-hatch adhesion since the edges of the cuts are completely smooth and no squares of the lattice is detached.

A coating having good chemical resistance and flexibility is characterized by having at least 25 MEK double rubs and a T-bend of 4 or less than 4. All the coatings in Table I have good chemical resistance since they have more than 25 MEK double rubs.

EXAMPLE 20

Preparation of Cationic Epoxy Resin

A diglycidal ether of bisphenol A epoxy resin (commercially available from The Dow Chemical Company as D.E.R. 664) having an epoxide equivalent weight of 932 (390.5 grams, 0.4190 equivalents) and 46.1 grams (0.2095 equivalents) of nonylphenol are added to a five neck 1 liter glass flask equipped with a means for purging nitrogen, temperature control, stirring, condensing, and reaction additions. The resin mixture is slowly heated to 90° C. and 0.4 grams of a 70 percent by weight solution in methanol of ethyltriphenylphosphonium acetate-acetic acid complex (A1 catalyst) is added. The reactor is heated to 150° C. and allowed to exotherm. It is then heated to 175° C. and held at 175° C. for 1 hour. After cooling to 90° C, a mixture of 25.0 grams (0.2095 equivalents) of 4,4'-trimethylenebis(1-methylpiperidine), 25.89 grams (0.2095 moles) of a 73 weight percent lactic acid solution, and 45 grams (2.5 moles) of deionized water is added slowly. The reactants are stirred at 90° C. for six hours, the 197.8 grams of methyl isobutyl ketone solvent is added. The product is stored in a glass bottle.

Preparation of Blocked Isocyanate crosslinker

A blocked isocyanate crosslinker is prepared in a five neck 5 liter glass flask equipped with a means for nitrogen purging, temperature control, stirring, condensing, and reactant additions. A toluene diisocyanate trimethylol propane prepolymer, 60 percent by weight in methoxy propyl acetate solvent (commercially available from Spencer Kellogg Company as Spenkel P49-A6-60) having 0.2533 equivalents of isocyanate groups per 100 grams of solution (2505.2 grams, 6.346 equivalents of isocyanates) is heated to 50° C. in the flask while stirring. To this reactant is added 2.7 grams of dibutyltindilaurate catalyst. Next 825 grams (6.346 equivalents) of 2-ethylhexanol is added slowly while maintaining the temperature between 50 and 60° C. using forced air cooling to remove heat from the exothermic reaction. After the final addition, the product is held at 60° C. for one hour and then transferred to a glass bottle for storage.

Preparation of Aqueous Dispersion

An aqueous dispersion is prepared in a 2 liter glass reaction kettle fitted with a 2 inch diameter, air motor driven, Jiffy mixer, from a blend of 340 grams of the above mentioned resin, 132.3 grams of the above mentioned crosslinker, 22.3 grams of propylene glycol phenyl ether (commercially available from The Dow Chemical Company as DOWANOL PPH), and 600 grams of deionized water. The water is added slowly while mixing the components at high speed. The resulting dispersion is stirred slowly without a lid for 24 hours to strip the methyl isobutyl ketone solvent and some water. It is then diluted to a 20 percent aqueous dispersion by the addition of deionized water.

Preparation of Coating Dispersion and Cathodic Electrodeposition of Same

A coating dispersion is prepared by adding 1434 grams of the dispersion to 316 grams of deionized water and 142 grams of a pigment paste (commercially available from PPG Industries Inc. as E5994 - ED 4 pigment paste). After blending well, the pigmented dispersion is transferred to electrodeposition cell. The coating is applied by cathodic electrodeposition to a steel panel (0.66 mm thick×101.6 mm wide×304.8 mm long, which is pretreated with zinc phosphate) at 150 volts for 2 minutes at a bath temperature of 27° C. After rinsing in deionized water, the wet film is baked at 177° C. for 30 minutes.

What is claimed is:

1. A modified epoxy resin resulting from reacting a composition comprising
   (A) at least one epoxy resin selected from the group consisting of
      (1) at least one epoxy resin having an average of more than one vicinal epoxy group per molecule;
      (2) at least one epoxy resin having an average of more than one vicinal epoxy group per molecule wherein from about 1 to about 85 percent of the vicinal epoxy groups have been reacted with
         (a) at least one compound containing an aromatic hydroxyl group;
         (b) at least one compound containing a secondary amine group; or
         (c) any combination of (a) and (b): and
      (3) any combination of (1) and (2);
   (B) at least one tertiary amine-containing component selected from the group consisting of
      (1) at least one compound containing more than one aliphatic or cycloaliphatic tertiary amine group per molecule, which compound is essentially free of (a) aromatic ring moieties, (b) amide moieties, (c) carbamate moieties, (d) urea moieties and (e) primary amine moieties; or
      (2) a mixture of tertiary amine-containing compounds consisting essentially of
         (a) at least one compound containing more than one aliphatic or cycloaliphatic tertiary amine group per molecule, which compound is essentially free of (a) aromatic ring moieties, (b) amide moieties, (c) carbamate moieties, (d) urea moieties and (e) primary amine moieties: and
         (b) at least one compound containing only one tertiary amine group per molecule: and
   (C) at least one Brönsted acid.

2. A modified epoxy resin of claim 1 wherein
   (i) component (A-1) is a diglycidyl ether of either an aliphatic diol or an aromatic diol or; the product resulting from advancing such diglycidyl ether with an aromatic diol: a polyglycidyl ether of phenol-aldehyde novolac resin; a halogen or alkyl substituted phenolaldehyde novolac resin: the polyglycidyl ether of the reaction product of a cycloalkyldiene and phenol; or the polyglycidyl ether of the reaction product of a halogen or alkyl or oxyalkyl derivative of a cycloalkyldiene and phenol;
   (ii) component (A-2-a) is an epoxy resin selected from the same group as component (A-1) which has been reacted with a compound represented by the following formula

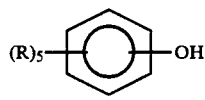

herein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms:
   (iii) component (A-2-b) is an epoxy resin selected from the same group as component (A-1) which has been reacted with a secondary amine-containing compound represented by the following formulas

wherein each R' is independently a hydrocarbyl or hydrocarbyloxy group having from 1 to about 20 carbon atoms, which hydrocarbyl or hydrocarbyloxy groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms:
   (iv) components (B-1 and B-2-a) are independently a compound represented by the following formulas

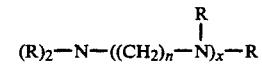

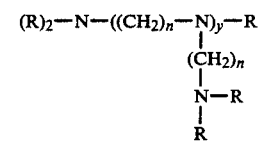

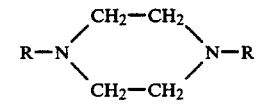

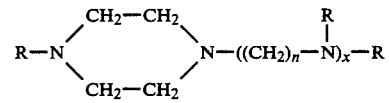

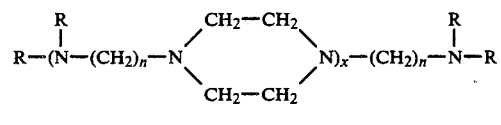

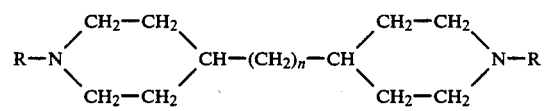

wherein R is independently an alkyl group having from 1 to about 10 carbon atoms; n has a value from 1 to about 20; x has a value from 1 to about 10: and y has a value from 2 to about 10: and
   (v) component (C) is an organic acid.

3. A modified epoxy resin of claim 2 wherein
   (i) component (A-1), is a diglycidyl ether of either of biphenol, bisphenol A, bisphenol F, bisphenol K or bisphenol S: or a polyglycidyl ether of phenol- or bromine or methyl substituted phenol-formaldehyde novolac resin: or the polyglycidyl ether of the reaction product of dicyclopentadiene with phenol or bromine or methyl substituted phenol: or the product resulting from advancing a diglycidyl ether of biphenol, bisphenol A, bisphenol F, bisphenol K or bisphenol S with biphenol, bisphenol A, bisphenol F, bisphenol K or bisphenol A;

(ii) in component (A-2-a), each R is independently hydrogen, chlorine, bromine, a hydrocarbyl or hydrocarbyloxy group having from 1 to about 10 carbon atoms and which hydrocarbyl or hydrocarbyloxy groups can contain substitutent groups such as a nitro group, or an alkyl or alkoxy group having from 1 to about 10 carbon atoms;

(iii) in component (A-2-b), each R' is independently a hydrocarbyl or hydrocarbyloxy group having from 2 to about 10 carbon atoms, which hydrocarbyl or hydrocarbyloxy groups can contain substituent groups such as a nitro group, a hydroxyl group. or an alkyl group having from 1 to about 10 carbon atoms: and R" is a divalent hydrocarbyl group or a divalent hydrocarbyl group containing such substitutent groups as a nitro group, a hydroxyl group, or an alkyl group having from 1 to about 10 carbon atoms; and (iv) in components (B-1) and (B-2-a), R is an alkyl group having from 1 to about 4 carbon atoms: x has a value from 1 to about 2; and y has a value from 2 to about 4.

4. A modified epoxy resin of claim 2 wherein (i) component (A-1) is a diglycidyl ether of bisphenol A which has been advanced with bisphenol A to an epoxide equivalent weight of from about 500 to about 5000:

(ii) component (A-2-a) is the product resulting from advancing a diglycidyl ether of bisphenol A with bisphenol A to an epoxide equivalent weight of from about 500 to about 5000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 5000, which product has been reacted with diethanolamine, methylethanolamine, ethylethanolamine, dibutylamine, or any combination thereof:

(iv) components (B-1) and (B-2-a) are independently N,N,N',N'-tetramethylethylenediamine, N,N,N',N'-tetramethyl-1,3-propanediamine, N,N,N',N'-tetramethyl-1,4-butanediamine, N,N,N',N'-tetramethyl-1,6-hexanediamine, 4,4'trimethylenebis(1-methylpiperidine), 1,4dimethylpiperazine, or any combination thereof:

(v) component (B-2-b) is trimethylamine, triethylamine, tri-n-propylamine, N,N-dimethylethanolamine, butyldimethylamine, N,N,N-dimethylphenethylamine, N-methylpiperidine, or any combination thereof: and (vi) component (C) is lactic acid, acetic acid, or any combination thereof.

5. A curable non-aqueous composition comprising (I) a modified epoxy resin resulting from reacting (A) at least one epoxy resin selected from the group consisting of (1) at least one epoxy resin having an average of more than one vicinal epoxy group per molecule:

(2) at least one epoxy resin having an average of more than one vicinal epoxy group per molecule wherein from about 1 to about 85 percent of the vicinal epoxy groups have been reacted with (a) at least one compound containing an aromatic hydroxyl group;

(b) at least one compound containing a secondary amine group: or (c) any combination of (a) and (b); and (3) any combination of (1) and (2):

(B) at least one tertiary amine-containing component selected from the group consisting of (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: or (2) a mixture of tertiary amine-containing compounds consisting essentially of (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties: and (b) at least one compound containing only one tertiary amine group per molecule;

(C) at least one Brönsted acid; and (II) a curing amount of at least one curing agent.

6. A curable non-aqueous composition of claim 5 wherein (i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether cf the reaction product of a cycloalkyldiene and phenol or halogen or alkyl or oxyalkyl derivative of phenol;

(ii) component (A-2-a) is an epoxy resin selected from the same group as component (A-1) which has been reacted with a compound represented by the following formula

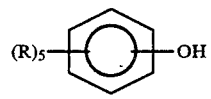

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;

(iii) component (A-2-b) is an epoxy resin enumerated as component (A-1) which has been reacted with a compound represented by the following formulas $$H-\underset{\underset{R'}{|}}{N}-R' \quad \text{or} \quad H-\underset{\underset{R'}{|}}{N}-R''-\underset{\underset{R'}{|}}{N}-H$$

wherein each R' is independently a hydrocarbyl or hydrocarbyloxy group having from 1 to about 20 carbon atoms, which hydrocarbyl or hydrocarbyloxy groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) components (B-1 and B-2-a) are independently a compound represented by the following formulas

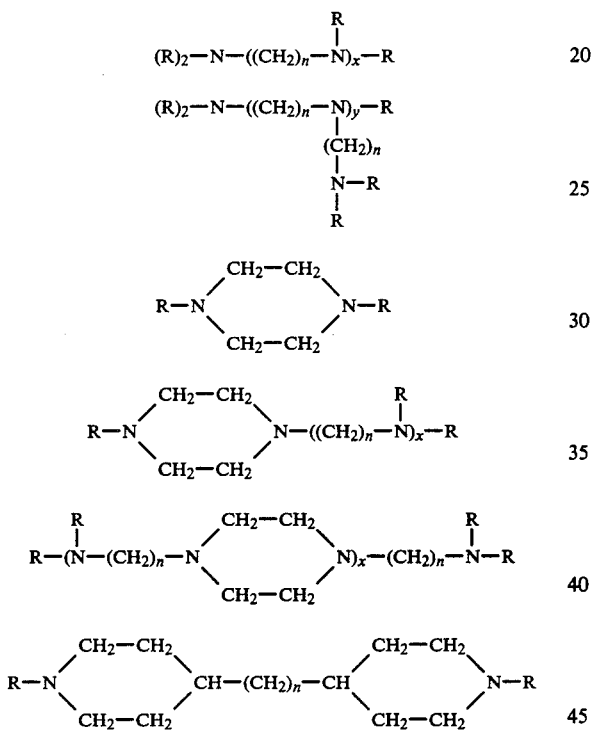

wherein R is an alkyl group having from 1 to about 10 carbon atoms: n has a value from 1 to about 20: x has a value from 1 to about 10: and y has a value from 2 to about 10:

(v) component (C) is an organic acid; and (vi) component (11) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

7. A curable non-aqueous composition of claim 6 wherein (i) component (A-1), is a diglycidyl ether of either of biphenol, bisphenol A, bisphenol F, bisphenol K or bisphenol S; or a polyglycidyl ether of phenol- or bromine or methyl substituted phenol-formaldehyde novolac resin; or the polyglycidyl ether of the reaction product of dicyclopentadiene with phenol or bromine or methyl substituted phenol: or the product resulting from advancing a diglycidyl ether of biphenol, bisphenol A, bisphenol AP, bisphenol F, bisphenol K or bisphenol S with biphenol, bisphenol A, bisphenol A.P, bisphenol F or bisphenol K:

(ii) in component (A-2-a), each R is independently hydrogen, chlorine. bromine, a hydrocarbyl or hydrocarbyloxy group having from 1 to about 10 carbon atoms and which hydrocarbyl or hydrocarbyloxy groups can contain substitutent groups such as a nitro group, or an alkyl or alkoxy group having from 1 to about 10 carbon atoms;

(iii) in component (A-2-b), each R' is independently a hydrocarbyl or hydrocarbyloxy group having from 2 to about 10 carbon atoms, which hydrocarbyl or hydrocarbyloxy groups can contain substituent groups such as a nitro group, a hydroxyl group, or an alkyl group having from 1 to about 10 carbon atoms; and R" is a divalent hydrocarbyl group or a divalent hydrocarbyl group containing such substitutent groups as a nitro group, a hydroxyl group, or an alkyl group having from 1 to about 10 carbon atoms:

(iv) in components (B-1) and (B-2-a), R is an alkyl group having from 1 to about 4 carbon atoms: x has a value from 1 to about 2: and y has a value from 2 to about 4; and (v) component (D) is hexamethoxymethylmelamine, highly methylated melamine-formaldehyde resin, highly alkylated methoxymethyl, isobutoxymethyl melamine-formaldehyde resin, highly alkylated ethoxymethoxy melamine-formaldehyde resin, a mixture of the allyl ethers of mono-, di- and trimethylol phenols, a mixture of allyl ethers of methylol phenol partially polymerized, 2-ethylhexanol blocked prepolymer of toluene diisocyanate and trimethylol propane, 2-ethylhexanol blocked prepolymer of diphenylmethane 4,4'-diisocyanate and diethylene glycol, 2-ethylhexanol blocked prepolymer of diphenylmethane 4,4'-diisocyanate and tripropylene glycol, or any combination thereof.

8. A curable non-aqueous composition of claim 6 wherein (i) component (A-1) is a diglycidyl ether of bisphenol A which has been advanced with bisphenol A to an epoxide equivalent weight of from about 500 to about 5000;

(ii) component (A-2-a) is the product resulting from advancing a diglycidyl ether of bisphenol A with bisphenol A to an epoxide equivalent weight of from about 500 to about 5000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 5000, which product has been reacted with diethanolamine, methylethanolamine, ethylethanolamine, dibutylamine, or any combination thereof:

(iv) components (B-1) and (B-2-a) are independently N,N,N',N'-tetramethylethylenediamine, N,N,N',N'-tetramethyl-1,3-propanediamine, N,N,N',N'-tetramethyl-1,4-butanediamine, N,N,N',N'-tetramethyl-1,6-hexanediamine, 4,4'-trimethylenebis(1-methylpiperidine), 1,4dimethylpiperazine, or any combination thereof;

(v) component (B-2-b) is, trimethylamine, triethylamine, tri-n-propylamine, N,N-dimethylethanolamine, butyldimethylamine, N,N,N-dimethylphenethylamine, N-methylpiperidine, or any combination thereof:

(vi) component (C) is lactic acid, acetic acid, or any combination thereof; and (vii) component (D) is highly methylated melamine-formaldehyde resin.

9. An aqueous composition having dissolved or dispersed in water a modified epoxy resin resulting from reacting a composition comprising
(A) at least one epoxy resin selected from the group consisting of
  (1) at least one epoxy resin having an average of more than one vicinal epoxy group per molecule:
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group;
    (b) at least one compound containing a secondary amine group: or
    (c) any combination of (a) and (b); and
  (3) combination of (1) and (2);
(B) at least one tertiary amine-containing component selected from the group consisting of
  (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primine amine moieties; or
  (2) a mixture of tertiary amine-containing compounds consisting essentially of
    (a) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primine amine moieties: and
    (b) at least one compound containing only one tertiary amine group per molecule: and
(C) at least one Brönsted acid.

10. An aqueous composition of claim 9 wherein
(i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol:

(ii) component (A-2-a) is an epoxy resin selected from the same group as component (A-1) and which has been reacted with a compound represented by the following formula

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms:

(iii) component (A-2-b) is an epoxy resin selected from the same group as component (A-1) and which has been reacted with a compound represented by the following formulas

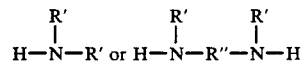

wherein each R' is independently a hydrocarbyl or hydrocarbyloxy group having from 1 to about 20 carbon atoms, which hydrocarbyl or hydrocarboyloxy groups can be substituted with a nitro gorup, a hydroxyl group, or an alkyl group having from 1 to 10 carbon atoms; and R" is a divalent hydrocarbyl group or a divalent hydrocarbyl group substituted with a nitro group, a hydroxyl group, or an alkyl group having from 1 to about 10 carbon atoms;

(iv) components (B-1 and B-2-a) are independently a compound represented by the following formulas

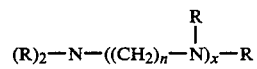

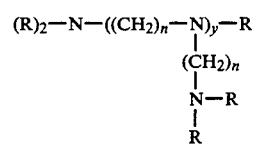

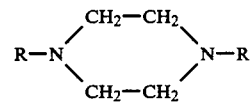

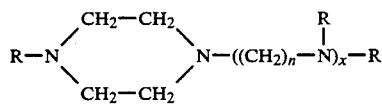

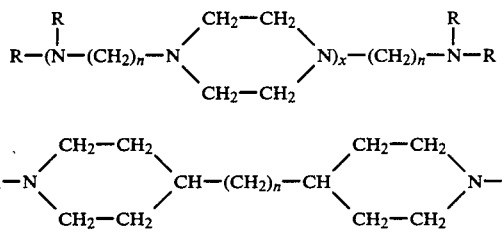

wherein R is an alkyl group having from 1 to about 10 carbon atoms; n has a value from 1 to about 20; x has a value from 1 to about 10; and y has a value from 2 to about 10; and (v) component (C) is an organic acid.

11. An aqueous composition of claim 10 wherein
(i) component (A-1), is a diglycidyl ether of either of biphenol, bisphenol A, bisphenol F, bisphenol K or bisphenol S; or a polyglycidyl ether of phenol- or bromine or methyl substituted phenol-formaldehyde novolac resin; or the polyglycidyl either of the reaction product of dicyclopentadiene with phenol or bromine or methyl substituted phenol; or the product resulting from advancing a diglycidyl ether of biphenol, bisphenol A, bisphenol F, bisphenol K or bisphenol S with biphenol, bisphenol A, bisphenol F, bisphenol K or bisphenol A:

(ii) in component (A-2-a), each R is independently hydrogen, chlorine, bromine, a hydrocarbyl or hydrocarbyloxy group having from 1 to about 10 carbon atoms and which hydrocarbyl or hydrocarbyloxy groups can contain substitutent groups such as a nitro group, or an alkyl or alkoxy group having from 1 to about 10 carbon atoms;

(iii) in component (A-2-b), each R' is independently a hydrocarbyl or hydrocarbyloxy group having from 2 to about 10 carbon atoms, which hydrocarbyl or hydrocarbyloxy groups can contain substituent groups such as a nitro group, a hydroxyl group, or an alkyl group having from 1 to about 10 carbon atoms: and R" is a divalent hydrocarbyl group or a divalent hydrocarbyl group containing such substitutent groups as a nitro group, a hydroxyl group, or an alkyl group having from 1 to about 10 carbon atoms and (iv) in components (B-1) and (B-2-a), R is an alkyl group having from 1 to about 4 carbon atoms: x has a value from 1 to about 2; and y has a value from 2 to about 4.

12. An aqueous composition of claim 10 wherein (i) component (A-1) is a diglycidyl ether of bisphenol A which has been advanced with bisphenol A to an epoxide equivalent weight of from about 500 to about 5000:

(ii) component (A-2-a) is the product resulting from advancing a diglycidyl ether of bisphenol A with bisphenol A to an epoxide equivalent weight of from about 500 to about 2000, which product has been reacted with phenol. nonylphenol, 4-n-propylphenol, 4-tertbutylphenol, or any combination thereof:

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;

(iv) components (B-1) and (B-2-a) are independently N,N,N',N'-tetramethylethylenediamine, N,N,N',N'-tetramethyl-1,3-propanediamine, N,N,N',N'-tetramethyl-1,4-butanediamine, N,N,N',N'-tetramethyl-1,6-hexanediamine, 4,4'-trimethylenebis(1-methylpiperidine), 1,4dimethylpiperazine, or any combination thereof:

(v) component (B-2-b) is trimethylamine, triethylamine, tri-n-propylamine, N,N-dimethylethanolamine, butyldimethylamine, N,N,N-dimethylphenethylamine, N-methylpiperidine, or any combination thereof; and (vi) component (C) is laetic acid, acetic acid, or any combination thereof.

13. A curable aqueous composition having dissolved or dispersed in water a composition comprising (I) a modified epoxy resin resulting from reacting a composition comprising (A) at least one epoxy resin selected from the group consisting of (1) at least one epoxy resin having an average of more than one vicinal epoxy group per molecule:

(2) at least one epoxy resin having an average of more than one vicinal epoxy group per molecule wherein from about 1 to about 85 percent of the vicinal epoxy groups have been reacted with
   (a) at least one compound containing an aromatic hydroxyl group:
   (b) at least one compound containing a secondary amine group: or
   (c) any combination of (a) and (b): and (3) any combination of (1) and (2):

(B) at least one tertiary amine-containing component selected from the group consisting of (1) at least one compound containing more than one aliphatic or cycloaliphatic tertiary amine group per molecule, which compound is essentially free of (a) aromatic ring moieties, (b) amide moieties, (c) carbamate moieties, (d) urea moieties, and (e) primary amine moieties; or (2) a mixture of tertiary amine-containing compounds consisting essentially of
   (a) at least one compound containing more than one aliphatic or cycloaliphatio tertiary amine group per molecule, which compound is essentially free of (a) aromatic ring moieties, (b) amide moieties, (c) carbamate moieties, (d) urea moieties, and (e) primary amine moieties; and
   (b) at least one compound containing only one tertiary amine group per molecule; and (C) at least one Brönsted acid; and (II) a curing amount of at least one curing agent.

14. A curable aqueous composition of claim wherein (i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin selected from the same group as component (A-1) which has been reacted with a compound represented by the following formula $$(R)_5 \!-\!\!\left\langle\!\!\bigcirc\!\!\right\rangle\!\!-\! OH$$

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;

(iii) component (A-2-b) is an epoxy resin selected from the same group as component (A-1) which has been reacted with a compound represented by the following formulas

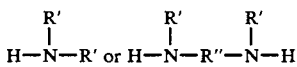

wherein each R' is independently a hydrocarbyl or hydrocarbyloxy group having from 1 to about 20 carbon atoms, which hydrocarbyl or hydrocarbyloxy groups can be substituted with a nitro group, a hydroxyl group, or an alkyl group having from 1 to about 10 carbon atoms: and R" is a divalent hydrocarbyl group or a divalent hydrocarbyl group substituted with a halogen atom, a nitro group, a hydroxyl group, or an alkyl group having from 1 to about 10 carbon atoms;

(iv) components (B-1 and B-2-a) are independently a compound represented by the following formulas

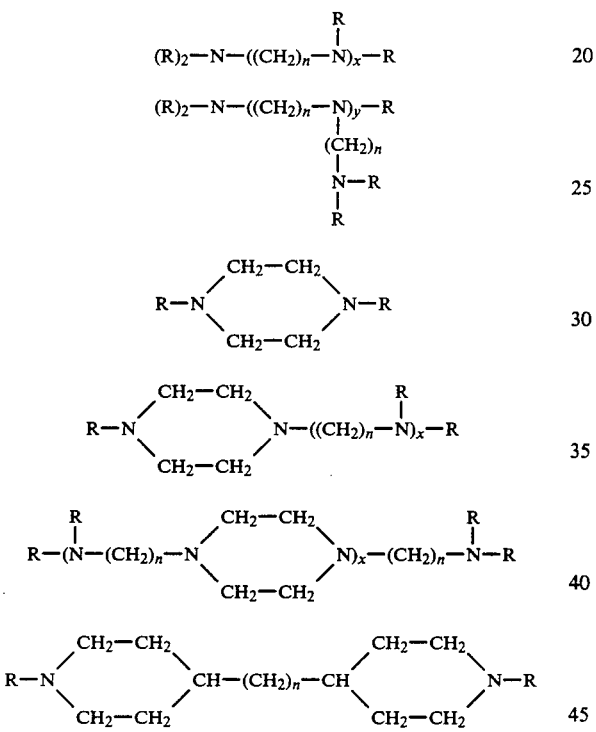

wherein R is an alkyl group having from 1 to about 10 carbon atoms; n has a value from 1 to about 20: x has a value from 1 to about 10; and y has a value from 2 to about 10:

(v) component (C) is an organic acid: and (vi) component (II) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

15. A curable aqueous composition of claim 14 wherein (i) component (A-1), is a diglycidyl ether of either of biphenol, bisphenol A, bisphenol F, bisphenol K or bisphenol S: or a polyglycidyl ether of phenol- or bromine or methyl substituted phenol-formaldehyde novolac resin; or the polyglycidyl ether of the reaction product of dicyclopentadiene with phenol or bromine or methyl substituted phenol; or the product resulting from advancing a diglycidyl ether of biphenol, bisphenol A, bisphenol F, bisphenol K or bisphenol S with biphenol, bisphenol A, bisphenol F, bisphenol K or bisphenol A;

(ii) in component (A-2-a), each R is independently hydrogen, chlorine, bromine, a hydrocar hydrocarbyloxy group having from 1 to about 10 carbon atoms and which hydrocarbyl or hydrocarbyloxy groups can contain substitutent groups such as a nitro group, or an alkyl or alkoxy group having from 1 to about 10 carbon atoms:

(iii) in component (A-2-b), each R' is independently a hydrocarbyl or hydrocarbyloxy group having from 2 to about 10 carbon atoms, which hydrocarbyl or hydrocarbyloxy groups can contain substituent groups such as a nitro group, a hydroxyl group, or an alkyl group having from 1 to about 10 carbon atoms: and R" is a divalent hydrocarbyl group or a divalent hydrocarbyl group containing such substitutent groups as a nitro group, a hydroxyl group, or an alkyl group having from 1 to about 10 carbon atoms:

(iv) in components (B-1) and (B-2-a), R is an alkyl group having from 1 to about 4 carbon atoms; X has a value from 1 to about 2; and y has a value from 2 to about 4:

(v) component (D) is hexamethoxymethylmelamine, highly methylated melamine-formaldehyde resin, highly alkylated methoxymethyl, isobutoxymethyl melamine-formaldehyde resin, highly alkylated ethoxymethoxy melamine-formaldehyde resin, 2e-thylhexanol blocked prepolymer of toluene diisocyanate and trimethylol propane, 2ethylhexanol blocked prepolymer of diphenylmethane 4,4'-diisocyanate and diethylene glycol, 2-ethylhexanol blocked prepolymer of diphenylmethane 4,4'-diisocyanate and tripropylene glycol, or any combination thereof.

16. A curable aqueous composition of claim 14 wherein (i) component (A-1) is a diglycidyl ether of bisphenol A which has been advanced with bisphenol A to an epoxide equivalent weight of from about 500 to about 5000;

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof:

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine or any combination thereof;

(iv) components (B-1) and (B-2-a) are independently N,N,N',N-tetramethylethylenediamine, N,N,N',N'-tetramethyl-1,3-propanediamine, N,N,N',N'-tetramethyl-1,4-butanediamine, N,N,N',N'-tetramethyl-1,6-hexanediamine, 4,4,-trimethylenebis(1-methylpiperidine), 1,4-dimethylpiperazine, or any combination thereof:

(v) component (B-2-b) is trimethylamine, tri-n-propylamine, N,N-dimethylethanolamine, butyldimethylamine, N,N,N-dimethylphenethylamine, N-methylpiperidine or any combination thereof;

(vi) component (C) is lactic acid, acetic acid, or any combination thereof: and (vii) component (D) is highly methylated melamine-formaldehyde resin, or any combination thereof.

17. An aqueous coating composition comprising a curable aqueous composition of claim 13, 14, 15 or 16 and one or more additives.

18. An article coated with an aqueous coating composition of claim 17 which composition has been cured subsequent to being applied to said article.

19. A non-aqueous coating composition comprising a curable composition of claim 5, 6, 7 or 8 and one or more additives.

20. An article coated with a non-aqueous coating composition of claim 19 which composition has been cured subsequent to being applied to said article.

21. A product resulting from curing a curable composition of claim 5, 6, 7, 8, 13, 14, 15, or 16.

22. A product resulting from curing a curable composition of claim 21.

* * * * *

UNITED STATES PATENT AND TRADEMARK OFFICE
CERTIFICATE OF CORRECTION

PATENT NO. : 5,057,557

DATED : October 15, 1991

INVENTOR(S) : Duane S. Treybig et al.

Page 1 of 6

It is certified that error appears in the above-identified patent and that said Letters Patent is hereby corrected as shown below:

Column 21, line 23, change "(b):" to read --(b);--.

Column 21, line 39, change "moieties:" to read --moieties;--.

Column 21, line 42, change "molecule:" to read --molecule;--.

Column 21, line 48, change "diol:" to read --diol;--.

Column 21, line 50, change "resin:" to read --resin;--.

Column 21, line 67, change "herein" to read --wherein--.

Column 22, line 5, change "atoms:" to read --atoms;--.

Column 22, line 25, change "atoms:" to read --atoms;--.

Column 22, line 60, change "10:" to read --10;--.

Column 22, line 61, change "10:" to read --10;--.

Column 22, line 66, change "S:" to read --S;--.

Column 22, line 68, change "resin:" to read --resin;--.

Column 23, line 2, change "phenol:" to read --phenol;--.

Column 23, line 19, change "group." to read --group,--.

Column 23, line 20, change "atoms:" to read --atoms;--.

Column 23, line 26, change "atoms:" to read --atoms;--.

UNITED STATES PATENT AND TRADEMARK OFFICE
CERTIFICATE OF CORRECTION

PATENT NO. : 5,057,557

DATED : October 15, 1991

INVENTOR(S) : Duane S. Treybig et al.

It is certified that error appears in the above-identified patent and that said Letters Patent is hereby corrected as shown below:

Column 23, line 33, change "5000:" to read --5000;--.

Column 23, line 47, change "thereof:" to read --thereof;--.

Column 23, line 53, change "1,4dime-" to read --1,4-dime---.

Column 23, line 54, change "thereof:" to read --thereof;--.

Column 23, line 59, change "thereof:" to read --thereof;--.

Column 23, line 68, change "cule:" to read --cule;--.

Column 24, line 9, change "group:" to read --group;--.

Column 24, line 11, change "(2):" to read --(2);--.

Column 24, line 20, change "moieties:" to read --moieties;--.

Column 24, line 30, change "moieties:" to read --moieties;--.

Column 24, line 43, change "cf" to read --of--.

Column 25, line 48, change "atoms:" to read --atoms;--.

Column 25, line 48, change "20:" to read --20;--.

Column 25, line 49, change "10:" to read --10;--.

Column 25, line 50, change "10:" to read --10;--.

Column 25, line 53, change "melaminealdehyde" to read --maleamine-aldehyde--.

UNITED STATES PATENT AND TRADEMARK OFFICE
CERTIFICATE OF CORRECTION

PATENT NO. : 5,057,557

DATED : October 15, 1991

INVENTOR(S) : Duane S. Treybig et al.

It is certified that error appears in the above-identified patent and that said Letters Patent is hereby corrected as shown below:

```
Column 25, line 66, change "phenol:" to read --phenol;--.
Column 26, line 2, change "A.P" to read --AP--.
Column 26, line 3, change "K:" to read --K;--.
Column 26, line 5, change "chlorine." to read --chlorine,--.
Column 26, line 22, change "atoms:" to read --atoms;--.
Column 26, line 24, change "atoms:" to read --atoms;--.
Column 26, line 25, change "2:" to read --2;--.
Column 26, line 61, change "thereof:" to read --thereof;--.
Column 26, line 67, change "1,4dimethyl" to read --1,4-dimethyl--.
Column 27, line 16, change "molecule:" to read --molecule;--.
Column 27, line 24, change "group:" to read --group;--.
Column 27, line 42, change "moieties:" to read --moieties;--.
Column 27, line 45, change "molecule:" to read --molecule;--.
Column 27, line 55, change "nol:" to read --nol;--.
Column 28, line 5, change "atoms:" to read atoms;--.
Column 28, line 19, change "gorup" to read --group--.
```

UNITED STATES PATENT AND TRADEMARK OFFICE
CERTIFICATE OF CORRECTION

PATENT NO. : 5,057,557
DATED : October 15, 1991
INVENTOR(S) : Duane S. Treybig et al.

It is certified that error appears in the above-identified patent and that said Letters Patent is hereby corrected as shown below:

Column 29, line 5, change "A:" to read --A;--.

Column 29, line 20, change "atoms:" to read --atoms;--.

Col. 29, line 24, change "atoms" to read --atoms;--.

Column 29, line 26, change "atoms:" to read --atoms;--.

Column 29, line 33, change "5000:" to read --5000;--.

Column 29, line 38, change "phenol." to read --phenol,--.

Column 29, line 40, change "thereof:" to read --thereof;--.

Column 29, line 54, change "1,4dimethyl" to read --1,4-dimethyl--.

Column 29, line 61, change "laetic" to read --lactic--.

Column 30, line 3, change "molecule:" to read --molecule;--.

Column 30, line 10, change "group:" to read --group;--.

Column 30, line 12, change "group:" to read --group;--.

Column 30, line 13, change "(b):" to read --(b);--.

Column 30, line 14, change "(2):" to read --(2);--.

Column 30, line 27, change "cycloaliphatio" to read --cycloaliphatic--.

Column 30, line 37, change "claim" to read --claim 13--.

UNITED STATES PATENT AND TRADEMARK OFFICE
CERTIFICATE OF CORRECTION

PATENT NO. : 5,057,557

DATED : October 15, 1991

INVENTOR(S) : Duane S. Treybig et al.

It is certified that error appears in the above-indentified patent and that said Letters Patent is hereby corrected as shown below:

Column 31, line 11, change "atoms:" to read --atoms;--.

Column 31, line 48, change "20:" to read --20;--.

Column 31, line 50, change "10:" to read --10;--.

Column 31, line 51, change "acid:" to read --acid;--.

Column 31, line 62, change "S:" to read --S;--.

Column 32, line 4, change "a hydrocar" to read --a hydrocarbyl or--.

Column 32, line 9, change "atoms:" to read --atoms;--.

Column 32, line 17, change "atoms:" to read --atoms;--.

Column 32, line 20, change "atoms:" to read --atoms;--.

UNITED STATES PATENT AND TRADEMARK OFFICE
CERTIFICATE OF CORRECTION

PATENT NO.  : 5,057,557
DATED       : October 15, 1991
INVENTOR(S) : Duane S. Treybig et al.

It is certified that error appears in the above-indentified patent and that said Letters Patent is hereby corrected as shown below:

Column 32, line 24, change "4:" to read --4;--.
Column 32, line 30, change "2e" to read --2-e--.
Column 32, line 32, change "2ethylhexanol" to read --2-ethylhexanol--.
Column 32, line 50, change "thereof:" to read --thereof;--.
Column 32, line 62, change "4,4-" to read --4,4---.
Column 32, line 64, change "thereof:" to read --thereof;--.
Column 33, line 2, change "thereof:" to read --thereof;--.

Signed and Sealed this

Twenty-fourth Day of August, 1993

Attest:

BRUCE LEHMAN

*Attesting Officer*   *Commissioner of Patents and Trademarks*